May 27, 1952
J. DOUSA
2,598,041
PNEUMATIC FEED DEVICE FOR HIGH-SPEED
AUTOMATIC TURRET LATHES
Filed Jan. 15, 1949
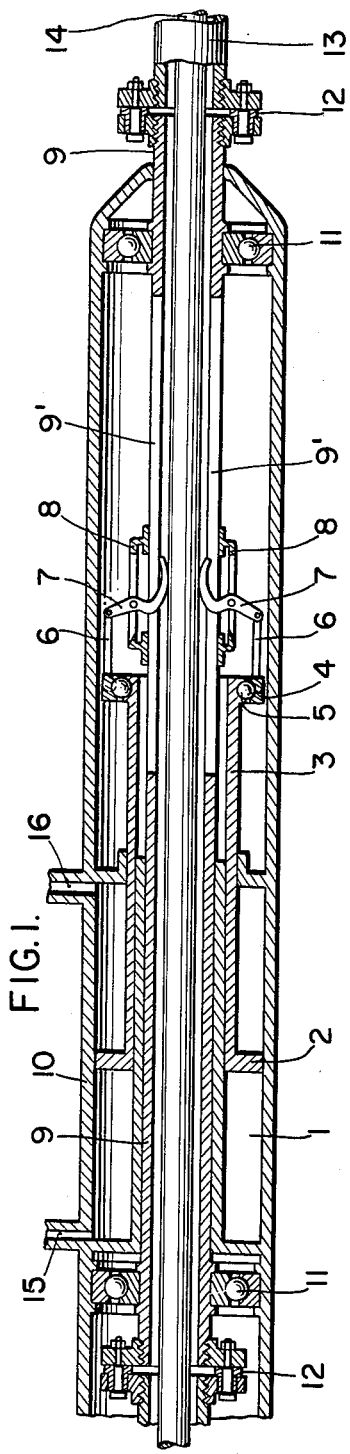
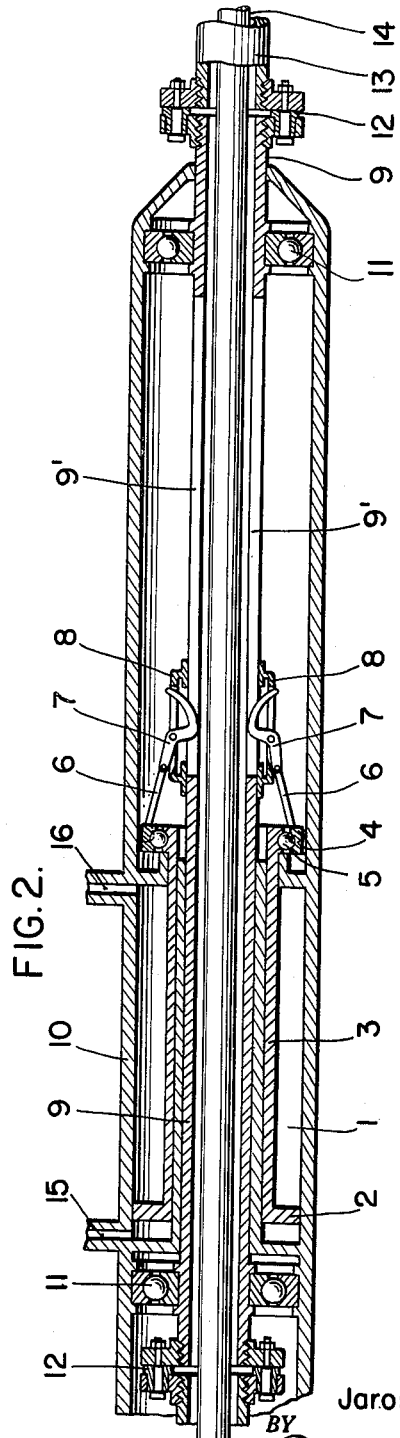
INVENTOR.
Jaroslav Doušá
BY
ATTORNEY Patented May 27, 1952

2,598,041

UNITED STATES PATENT OFFICE 2,598,041

PNEUMATIC FEED DEVICE FOR HIGH-SPEED AUTOMATIC TURRET LATHES

Jaroslav Doušа, Dobrany, Czechoslovakia, assignor to Skoda Works, National Corporation, Plzen, Czechoslovakia Application January 15, 1949, Serial No. 71,192
In Czechoslovakia February 2, 1948

1 Claim. (Cl. 29—61)

My invention relates to a bar stock feeding device for automatic lathes.

The known devices of this type have the disadvantage that they have to be specifically adapted for bar stock of each different diameter. In addition thereto they are not reliable when cooperating with high speed lathes.

The main object of my invention is to overcome the said disadvantages by making the feeding device applicable to bar stock of any desired diameter without necessitating the exchange or adjustment of any parts thereof and by insuring its dependability at any speed of the lathe.

The said and other objects of my invention will be more fully understood from the following specification when read with the accompanying drawing wherein one embodiment of my new feeding device is schematically illustrated in Figs. 1 and 2 which show longitudinal sectional views thereof in two different working positions more particularly described hereinafter.

The bar stock 14 to be fed into the lathe through its hollow spindle 13 passes through a tubular mandrel 9 which is coaxially connected to said spindle 13 by elastic couplings 12 to rotate therewith. Said mandrel 9 is rotatably mounted within a stationary body 10 and is supported therein by bearings 11. The body 10 includes a cylinder 1 into which a pressure medium such as compressed air is introduced through controllable inlet openings 15 and 16, respectively, to actuate the annular piston 2 in the cylinder 1 in one or the other direction. The piston 2 is connected to a tubular piston rod 3 which on its outer end rotatably supports a ring 4 by means of the bearing 5. A plurality of push and pull rods 6 is linked to said ring 4 and each of said rods 6 is jointed with its other end to one arm of a double armed gripper 7. These grippers 7 are swingably mounted in a sleeve 8 which rests slidably upon the mandrel 9 in front of the piston rod 3. The gripping arm of each gripper 7 extends through a longitudinal slot 9' against the bar stock 14 so that the same is seized as shown in Fig. 1 and is fed into the lathe when pressure medium entering the cylinder 2 through the inlet opening 15 moves the piston 2 from left to right out of the position shown in Fig. 2.

When thereafter pressure medium is introduced into the cylinder 1 through the inlet opening 16, the piston 2 with the piston rod 3 and the ring 4 will move back from right to left drawing along by means of the rods 6 the sleeve 8 with the grippers 7 seated therein so that said grippers will swing into the position shown in Fig. 2 and will release the bar stock 14.

The disclosed feeding device may be used for bar stock of any diameter ranging from a maximum given by the diameter of the bore of the spindle 13 down to a diameter of about 2 mm.

It will be well understood that by connecting my new feeding device by means of a pressure piping including a control valve, with a suitable pneumatic chuck for the bar stock to be worked upon in the lathe, the bar stock may be automatically fed into the lathe whenever said chuck is released.

Although only one specific embodiment of my invention has been schematically shown and described by way of illustration, it will be understood that my new feeding device may be otherwise constructed without departing from the principles of my invention.

What I claim as my invention is:

A bar stock feeding device for automatic lathes having a hollow spindle comprising in combination a rotatable mounted tubular mandrel coaxially connected to the hollow machine spindle to receive the bar stock, a stationary cylinder concentrically surrounding said mandrel, a conduit for a pressure medium at each of the opposing ends of said cylinder, an annular piston movable in said cylinder between said conduits, a tubular piston rod attached to said piston and surrounding said mandrel, a ring rotatably mounted upon the outer end of the piston rod coaxially therewith, a sleeve slidable on said mandrel in front of the piston rod, at least two opposing longitudinal slots in said mandrel, at least two double-armed grippers swingably mounted in said sleeve, the gripping arms of said grippers extending through said slots against the bar stock and adjusted to seize the same, rods connecting the other arms of said grippers with said rotatable ring, whereby bar stock of any diameter smaller than the inner diameter of the mandrel is gripped and fed through the hollow machine spindle while the piston moves in one direction and is automatically released when the piston returns.

JAROSLAV DOUŠA.

REFERENCES CITED

The following references are of record in the file of this patent:

UNITED STATES PATENTS

| Number | Name | Date |
|---|---|---|
| 992,845 | Brochu | May 23, 1911 |
| 1,080,359 | Mattison | Dec. 2, 1913 |
| 1,697,532 | Lilleberg | Jan. 1, 1929 |

FOREIGN PATENTS

| Number | Country | Date |
|---|---|---|
| 422,406 | Great Britain | Jan. 10, 1935 |
| 486,091 | Great Britain | May 27, 1936 |
| 564,269 | Germany | Nov. 17, 1932 |
| 683,290 | Germany | Nov. 3, 1939 |